C. W. KELSEY.
MOTOR VEHICLE.
APPLICATION FILED OCT. 25, 1915.
1,219,007.
Patented Mar. 13, 1917.
3 SHEETS—SHEET 3.
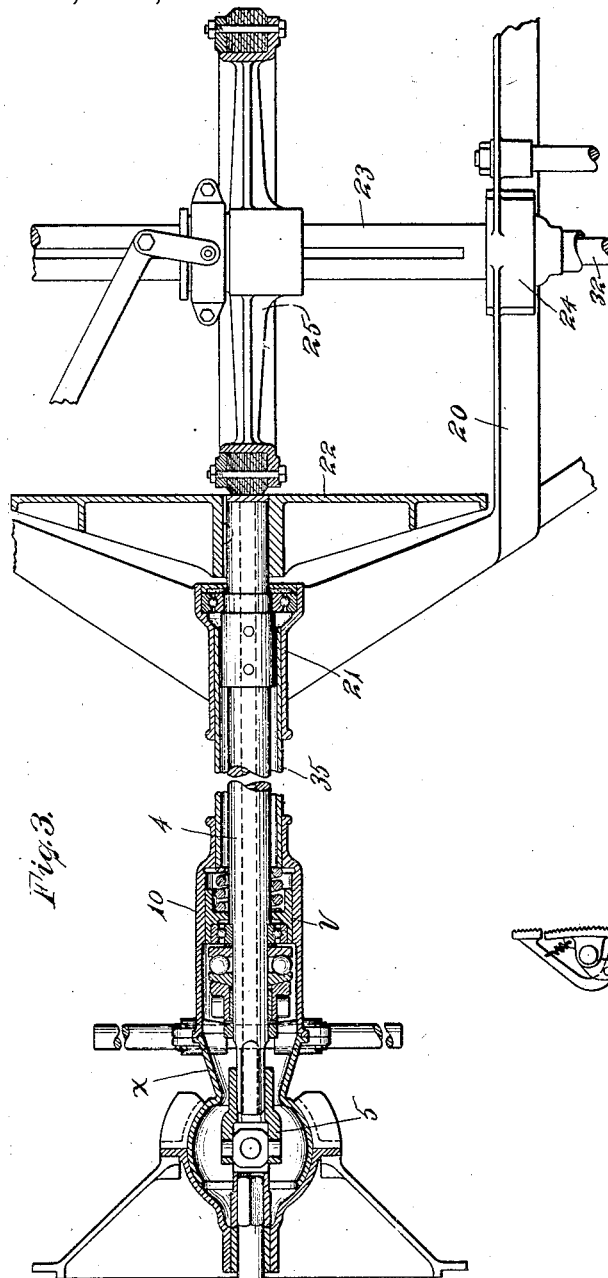
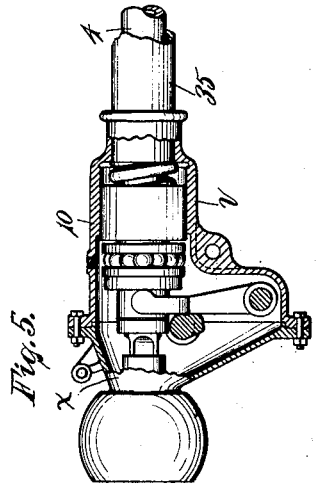
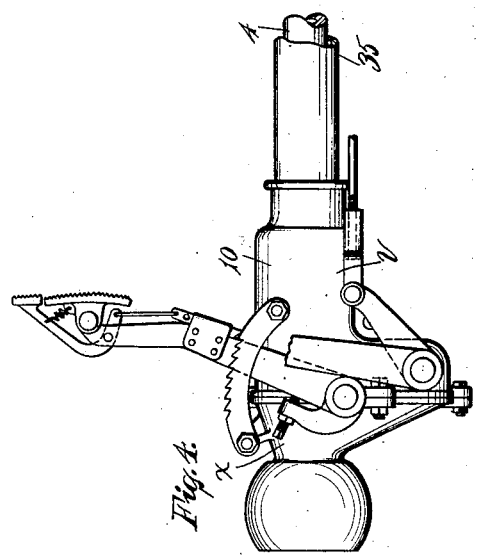
WITNESSES:
INVENTOR.
Cadwallader W. Kelsey,
BY
ATTORNEY.

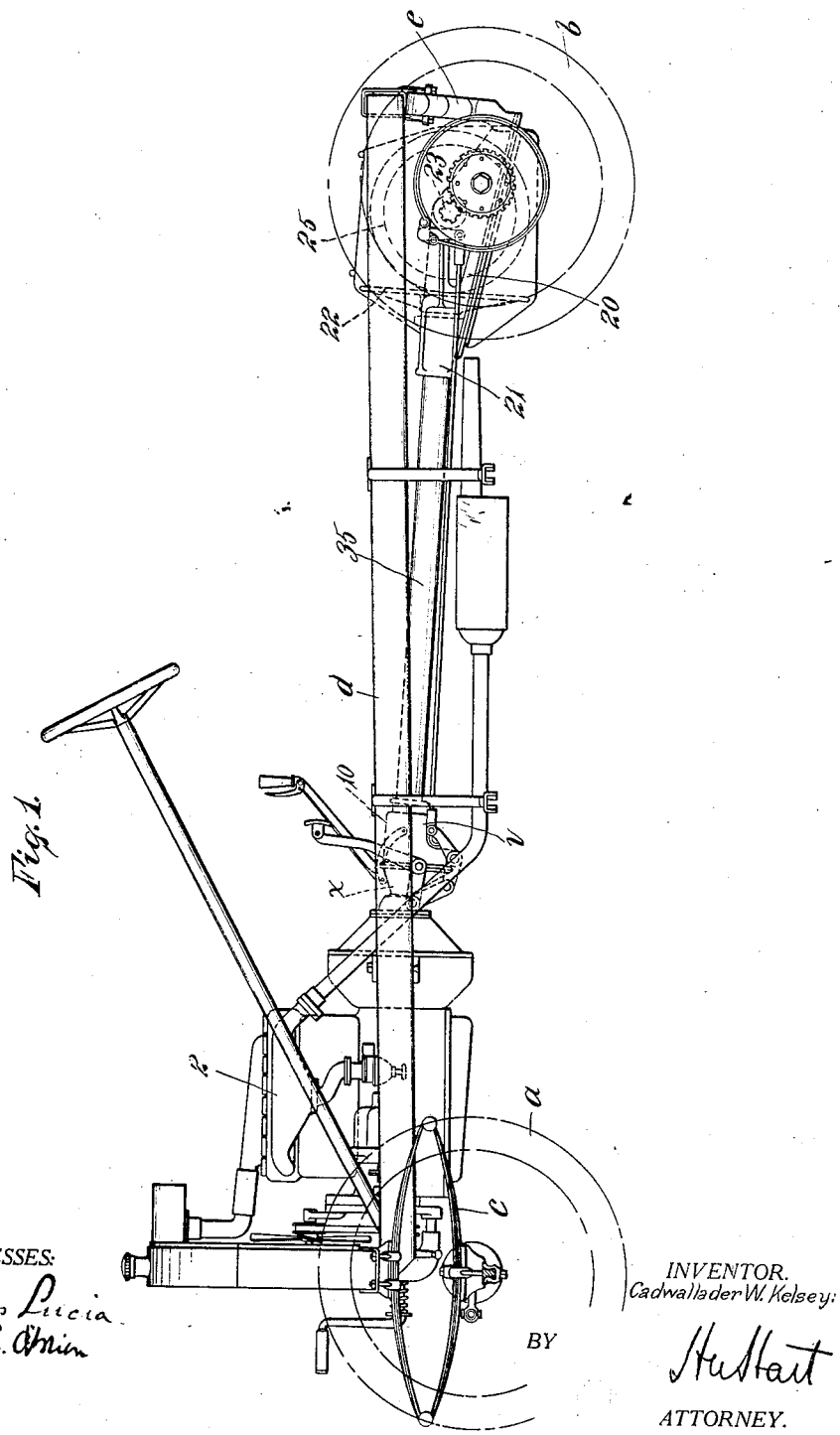

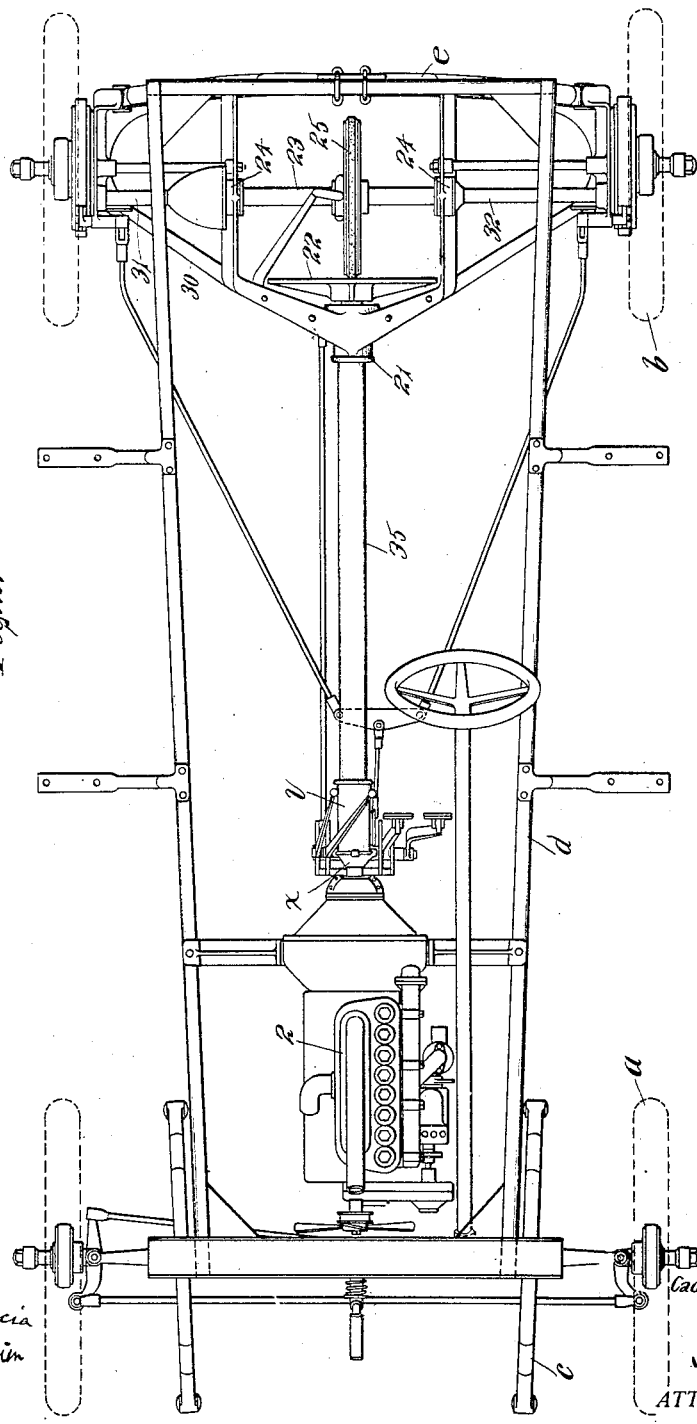

UNITED STATES PATENT OFFICE.

CADWALLADER W. KELSEY, OF HARTFORD, CONNECTICUT.

MOTOR-VEHICLE.

1,219,007.  Specification of Letters Patent.  Patented Mar. 13, 1917.

Application filed October 25, 1915. Serial No. 57,629.

*To all whom it may concern:*

Be it known that I, CADWALLADER W. KELSEY, a citizen of the United States, and a resident of Hartford, in the county of Hartford, State of Connecticut, have invented certain new and useful Improvements in Motor-Vehicles, of which the following is a specification.

This invention relates particularly to friction driven motor vehicles, and has for its object the transmission of power from the motor to the friction mechanism of the vehicle through a shaft, and the transmission of the power from the friction mechanism to the propeller wheels without the use of chains.

In the drawings—

Figure 1 is a side view of a motor vehicle made in accordance with my invention.

Fig. 2 is a plan view thereof.

Fig. 3 is a sectional plan view on enlarged scale of the rear axle construction.

Fig. 4 is a sectional view on enlarged scale of the connection between the motor shaft and propeller shaft.

Fig. 5 is a side elevation thereof.

In the drawings, *a* denotes the front vehicle wheels, *b* the rear vehicle wheels, *c* the spring supporting the vehicle frame *d* at its forward end, and *e* the spring supporting the vehicle frame from the rear wheels at its rear end. 2 denotes the motor mounted at the forward end of the vehicle frame, and consequently spring supported. 3 is the motor shaft. 4 is the propeller shaft directly connected to the motor shaft through the flexible coupling 5, thus connecting these two shafts permanently together so that they will always rotate in unison, the flexible coupling allowing for angular movement of the propeller shaft relative to the motor shaft. The propeller shaft runs through and has a bearing in a two-piece housing 10, the two parts *x*, *y*, of this housing having abutting flanges 12 which are bolted together. The forward part *x* of this housing is connected with the motor frame by a flexible connection so that the housing can move relative to the motor frame. The rear axle frame 20 is mounted directly on the rear wheels; that is to say, the rear wheel shafts have bearings in this frame, the frame being thus non-spring-supported. This frame has a bearing 21 for the rear end of the propeller shaft, which projects through the bearing and has secured to its end the friction disk 22. The shaft 23 is arranged at right angles to the propeller shaft and is mounted in bearings 24 in the rear axle frame, in fixed relation with the bearing 21 for the rear end of the propeller shaft. On this shaft 23 is slidingly mounted the friction wheel 25 which is keyed thereto.

In the embodiment shown the propeller shaft is movable longitudinally to move the friction disk 22 into and out of engagement with the friction wheel 25. Other and convenient methods of providing for this engagement and disengagement may be used. In the embodiment shown the friction wheel shaft 23 is coupled to the differential 30, and to members of this differential mechanism are connected the alined shafts 31, 32, between which and the rear vehicle wheels reduction gearing is interposed, as clearly seen in Fig. 3. Between the rear axle frame and the housing 10 extends a supporting member 35 which holds the rear axle frame in position. This supporting member may take other forms than that here illustrated.

By this construction it will be seen that on the rigid rear axle frame there are provided bearings, all in fixed relation to one another, for the rear wheel shafts, the driven member of the friction mechanism and the driving member of the friction mechanism providing what in the terminology of the art is known as a rear axle construction, all parts of which may be assembled in proper relation, and then the complete structure assembled into a machine. As clearly seen in Figs. 1, 2, 4 and 5, the operating levers for the brakes and for the sliding of the friction wheel, and for the movement of the friction disk, are mounted on the housing, and the point of connection between the parts *x*, *y*, of the housing represents in the embodiment here illustrated the point of assembly of the rear end mechanism with the motor. In other words, by removing the bolts which connect together the parts *x*, *y*, of the housing, and disconnecting the spring suspension of the vehicle frame from the rear wheels, the entire rear end construction up to and including the part *y* of the housing can be removed.

There is thus provided a vehicle which is friction driven but entirely shaft propelled; all parts of the friction mechanism and its connection to the rear wheels are mounted in a rigid member, the rear axle frame, insuring perfect alinement and positioning of the parts and the various shafts relative to one another, avoiding the necessity for a clutch or intricate and expensive change speed gearing between the motor shaft and the propeller shaft. The propeller shaft always runs at the same speed as the motor shaft, and the common support for the driving connections between the friction mechanism and the rear wheels produces a rigidity of construction necessary in mechanism of this sort, and the reduction gearing which is also mounted on this rigid common support permits of the rotation of the driven member of the friction mechanism at a greater speed than the propeller wheels.

I am aware that the structure selected for illustration and description is susceptible of various modifications and changes without departing from the spirit of the invention as defined in the appended claims.

I claim as my invention:—

1. In a motor vehicle, front and rear vehicle wheels, a vehicle frame yieldingly supported therefrom, a rear axle frame unyieldingly supported by the rear wheels, a motor and its shaft carried by the vehicle frame, a rigid propeller shaft, a support for the forward end thereof from said vehicle frame, a flexible coupling connecting said motor shaft and propeller shaft, a bearing in said rear axle frame for the rear end of said propeller shaft, a friction disk secured to the rear end of said propeller shaft, a friction wheel carried by said rear axle frame and coöperating with said disk, said wheel being mounted for movement relative to said disk to change its speed and direction of rotation, and reduction gearing mounted on said rear axle frame and connecting said friction wheel and the rear vehicle wheels.

2. In a motor vehicle, front and rear wheels, a vehicle frame spring supported therefrom, a motor and its shaft mounted at the forward end of the frame, change speed friction driving mechanism wholly supported by said rear wheels, reduction gearing between the driven member thereof and the rear wheels, a rigid propeller shaft to the rear end of which is secured the driving member of said friction mechanism, and a flexible coupling forming a direct permanent driving connection between the forward end of said propeller shaft and said motor shaft.

3. In a motor vehicle, a vehicle frame, a front axle and a spring suspension therefrom for said frame, a rear axle frame and a spring suspension therefrom for said vehicle frame, wheels supporting said front axle and said rear axle frame, a motor mounted in the forward end of said vehicle frame, a change speed friction driving mechanism mounted on said rear axle frame, a driving connection between the driven member of said friction mechanism and said rear wheels, reduction gearing forming a part of said driving connection, a rigid propeller shaft, a flexible connection interposed between the motor shaft and the forward end of the propeller shaft, and to the opposite sides of which the said shafts are connected to cause said shafts to always rotate together, and the driving member of said friction mechanism secured to the rear end of said propeller shaft.

4. In a motor vehicle, a front axle, a rear axle frame, wheels supporting said front axle and rear axle frame, a vehicle frame spring supported from said front axle and rear axle frame, a motor mounted on said vehicle frame, friction driving mechanism mounted on the rear axle frame, a rigid propeller shaft provided at one end with a flexible connection with said motor and at its opposite end receiving the driving member of said friction mechanism whereby said motor, propeller, shaft and driving member are permanently connected to rotate together at the same speed, means for engaging and disengaging the members of said friction mechanism, and means for moving the driven member thereof relatively to the driving member to vary and change the direction of rotation of the driven member, reduction gearing between said driven member and the rear vehicle wheels, and a differential mechanism between said wheels.

5. In a motor vehicle, front and rear wheels, a vehicle frame spring supported therefrom, a rear axle frame supported by said rear wheels, a motor and its shaft at the forward end of said vehicle frame, a rigid propeller shaft, a bearing in said rear axle frame for the rear end of propeller shaft, a friction disk mounted at the rear end of said propeller shaft, a friction wheel movable across the face of said friction disk, a friction wheel shaft and bearings therefor on said rear axle frame in fixed relation with the bearing of said propeller shaft, wheel shafts and suitable bearings therefor in said rear axle frame in fixed relation with said friction wheel shaft, reduction gearing between said friction wheel shaft and said rear wheels, differential mechanism between the rear wheels, a housing, a flexible joint connecting said housing with said motor, a support between said rear axle frame and said housing, a flexible coupling directly connecting said motor shaft to the forward end of said propeller shaft.

6. In a motor vehicle, front and rear wheels, a vehicle frame spring supported therefrom, a rear axle frame mounted on the rear wheels, a motor mounted at the forward end of the vehicle frame, change speed friction driving mechanism, shafts for the driving and driven members thereof mounted on said rear axle frame, reduction gearing between the driven member thereof and said rear wheels, differential mechanism between said rear wheels, a forwardly extending support for said rear axle frame, a flexible connection between the forward end of said support and said vehicle frame, a rigid propeller shaft extending between the driving member of said friction mechanism and said motor, and a flexible coupling directly and permanently securing said motor shaft to the forward end of said propeller shaft.

7. In a motor vehicle, the rear vehicle wheels, a rear axle frame carried directly by said wheels, change speed friction driving mechanism comprising a driving and driven member, shafts therefor mounted on said rear axle frame in fixed relation with respect to one another, reduction gearing between the driven member of said friction mechanism and said wheels, differential mechanism between said wheels, a motor and its shaft, a spring suspension therefor, a rigid propeller shaft having its rear end secured to the driving member of said friction mechanism and its forward end permanently connected with said motor shaft through a flexible coupling.

8. In a motor vehicle, front and rear vehicle wheels and a vehicle frame supported therefrom, a rear axle frame carried by the rear wheels, a motor and its shaft carried by the vehicle frame, a rigid propeller shaft, a flexible coupling connecting said motor and propeller shafts, a bearing in said rear axle frame for the rear end of said propeller shaft, a friction disk secured to the rear end of said propeller shaft, a friction wheel carried by said rear axle frame coöperating with said disk and movable across the face thereof to change its speed and direction of rotation, driving connections between said friction wheel and said rear vehicle wheels, and a reduction gearing forming a part of said driving connection.

CADWALLADER W. KELSEY.

Witnesses:
A. E. O'BRIEN,
H. E. HART.